(12) United States Patent
Koylazov et al.

(10) Patent No.: US 9,836,876 B1
(45) Date of Patent: Dec. 5, 2017

(54) RENDERING IMAGES USING RAY TRACING WITH MULTIPLE LIGHT SOURCES

(71) Applicant: Chaos Software Ltd., Sofia (BG)

(72) Inventors: Vladimir Koylazov, Sofia (BG); Blagovest Taskov, Sofia (BG)

(73) Assignee: Chaos Software Ltd., Sofia (BG)

( * ) Notice: Subject to any disclaimer, the term of this patent is extended or adjusted under 35 U.S.C. 154(b) by 0 days.

(21) Appl. No.: 15/635,123

(22) Filed: Jun. 27, 2017

(51) Int. Cl.
*G06T 15/50* (2011.01)
*G06T 15/06* (2011.01)
*G06T 15/00* (2011.01)

(52) U.S. Cl.
CPC .......... *G06T 15/506* (2013.01); *G06T 15/005* (2013.01); *G06T 15/06* (2013.01)

(58) Field of Classification Search
CPC ...... G06T 15/506; G06T 15/005; G06T 15/06
See application file for complete search history.

(56) References Cited

PUBLICATIONS

Wang, Xiaomei. *Efficient Ray Tracing of Many Light Sources.* Published Jun. 1999. Retrieved on Jun. 28, 2017. Retrieved from the Internet: URL <http://citeseerx.ist.psu.edu/viewdoc/download-?doi=10.1.1.632.5836&rep=rep1&type=pdf>. 107 pages.

Bouatouch, Kadi. *Stochastic Ray Tracing.* Published May 21, 2006. Retrieved on Jun. 27, 2017. Retrieved from the internet: URL<http://www.irisa.fr/prive/kadi/Cours_LR2V/Cours/StochasticRayTracing.pdf>. 21 pages.

Gouraud, Henri. *Continuous Shading of Curved Surfaces.* IEEE Transactions on Computers, col. C-20, No. 6. Published Jun. 1971. Retrieved on Jun. 27, 2017. Retrieved from the Internet: URL<http://page.mi.fu-berlin.de/block/htw-lehre/wise2015_2016/bel_und_rend/skripte/gouraud1971.pdf>. 7 Pages.

Hanrahan, P. *Monte Carlo Path Tracing.* Published Jul. 2003. Retrieved on Jun. 27, 2017. Retrieved from the internet: URL<http://cs.brown.edu/courses/cs224/papers/mc_pathtracing.pdf>. 19 pages.

Ize, Thiago. *Efficient Acceleration Structures for Ray Tracing Static and Dynamic Scenes.* Published Aug. 2009. Retrieved on Jun. 27, 2017. Retrieved from the Internet: URL<http://www.cs.utah.edu/~thiago/papers/thesis_ize.pdf>. 137 Pages.

(Continued)

*Primary Examiner* — Maurice L McDowell, Jr.
(74) *Attorney, Agent, or Firm* — Fish & Richardson P.C.

(57) ABSTRACT

Methods, systems, and apparatus, including computer programs encoded on a computer storage medium, for rendering an image of a scene affected by multiple light sources. In one aspect, a method includes subdividing the scene into cells; sampling light source—point pairs; for each pair, determining a contribution value of the light source to the point; for each cell and each light source: determining a maximum contribution value of the contribution values for the light source to the color of the points that are in the cell, and determining, based on the maximum contribution value, a significance value that is a measure of an estimated importance of the light source in rendering a portion of the image corresponding to the cell; and rendering the image of the scene by sampling light sources having a higher significance value more often than light sources having a lower significance value.

20 Claims, 8 Drawing Sheets

(56) References Cited

PUBLICATIONS

*Path Tracing With Multiple Lights*. Computer Graphics beta. Last Updated Mar. 13, 2017. Retrieved on Jun. 27, 2017. Retrieved from the internet: URL<https://computergraphics.stackexchange.com/questions/4792/path-tracing-with-multiple-lights>. 2 pages.

Phong, Bui Truong. *Illumination for Computed Generated Pictures*. Communications of the ACM, vol. 18, No. 6. Published Jun. 1975. Retrieved on Jun. 27, 2017. Retrieved from the Internet: URL<http://www.cs.northwestern.edu/~ago820/cs395/Papers/Phong_1975.pdf. 7 pages.

Plano, D. et al. *Multiple Light Source and Shadows*. Last Updated Jun. 2012. Retrieved on Jun. 27, 2017. Retrieved from the internet: URL<https://stab-iitb.org/newton-mirror/askasci/phy05/phy05122.htm>. 3 pages.

*Raytracing Shadows*. Stack Overflow. Last Updated Sep. 25, 2014. Retrieved on Jun. 27, 2017. Retrieved from the internet: URL<https://stackoverflow.com/questions/25942554/raytracing-shadows>. 9 pages.

Shirley, P. et al. "Ray Tracing." Chapter 10 from *Fundamentals of Computer Graphics*, Second Edition. A K Peters/CRC Press. Published Aug. 3, 2005. Retrieved on Jun. 27, 2017. Retrieved from the Internet: URL<https://www.cs.utah.edu/~shirley/books/fcg2/rt.pdf. pp. 201-238.

Spjut, Josef B. *Efficient Ray Tracing Architectures*. Published May 2015. Retrieved on Jun. 27, 2017. Retrieved from the Internet: URL<http://josef.spjut.me/pubs/thesis.pdf>. 129 pages.

Sunden, E. et al. *Efficient Volume Illumination with Multiple Light Sources through Selective Light Updates*. Visualization Symposium (PacificVis), 2015 IEEE Pacific, Apr. 2015. Retrieved on Jun. 27, 2017. Retrieved from the internet: URL<http://scivis.itn.liu.se/publications/2015/SR15/sunden15volillum.pdf>. 8 pages.

Ward, Gregory J. *Adaptive Shadow Testing for Ray Tracing*. 1991 Eurographics Workshop on Rendering. May 1991. Retrieved on Jun. 27, 2017. Retrieved from the internet: URL<http://radsite.1bl.gov/radiance/papers/erw91/erw91.html>. 6 pages.

US 9,836,876 B1

RENDERING IMAGES USING RAY TRACING WITH MULTIPLE LIGHT SOURCES

BACKGROUND

This specification relates to rendering images using ray tracing.

Ray tracing is a technique for rendering an image of a scene by casting rays that trace the path of light through pixels in an image plane and simulate the effects of the intersection of light with objects in the scene. This technique may be capable of producing highly realistic images and simulating a variety of optical effects, such as reflection and refraction, scattering, and dispersion phenomena.

SUMMARY

In general, one innovative aspect of the subject matter described in this specification can be embodied in for rendering an image of a scene, wherein the scene is affected by a plurality of light sources, wherein the methods include the actions of subdividing the scene into a plurality of cells; performing data collection to generate significance values, including: sampling a plurality of light source—point pairs, each pair including a respective light source of the plurality of light sources and a point in the scene; for each pair, determining a contribution value of the light source in the pair to a color of the point in the pair; for each cell and for each light source: determining a maximum contribution value of the contribution values for the light source to the color of the points that are in the cell, and determining, based on the maximum contribution value, a significance value that is a measure of an estimated importance of the light source in rendering a portion of the image corresponding to the cell; and rendering the image of the scene by sampling light sources having a higher significance value more often than light sources having a lower significance value.

Other embodiments of this aspect can include one or more of the following optional features. Determining a contribution value of the light source in a pair to a color of the point in the pair can include casting a ray from the point to the light source; and performing an analysis of the ray to determine to determine the contribution value. The methods can include the actions of determining, for each cell and for each light source, a ratio of a count of rays cast to the light source from the points in the cell that reached the light source and a total count of rays cast to the light source from the points in the cell; and updating each significance value for each cell and each light source based on the ratio associated with the corresponding cell and light source. The methods include the actions of for each cell, normalizing each significance value associated with the cell based on a sum of all significance values associated with the cell. The image can be captured from an image capturing point; and subdividing the scene into the plurality of cells includes creating a virtual space around the image capturing point, generating a plurality of quadrilaterals that neighbor the virtual space, and assigning points covered by each quadrilateral to a cell of the plurality of cells. Subdividing the scene into the plurality of cells can include dividing the scene into a plurality of 3-dimensional voxels and assigning points in an area covered by each 3-dimensional voxel to a cell of the plurality of cells. Subdividing the scene into the plurality of cells can include dividing the image into a plurality of portions; determining an area in the scene covered by each portion of the plurality of portions; and assigning points in each area in the scene covered by each portion of the plurality of portions to a cell of the plurality of cells.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments so as to realize one or more of the following advantages. Images of scenes can be rendered with a high degree of visual realism while reducing the computational cost of rendering images of scenes even when multiple light sources affect the scenes. Sampling light sources in a ray tracing rendering process can be performed using information about the interaction of light sources and cells in a scene, thus increasing the accuracy of sampling light sources. Rendering images can be performed more efficiently by reducing the number of light sources that need to be sampled to render a particular point in a captured scene.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
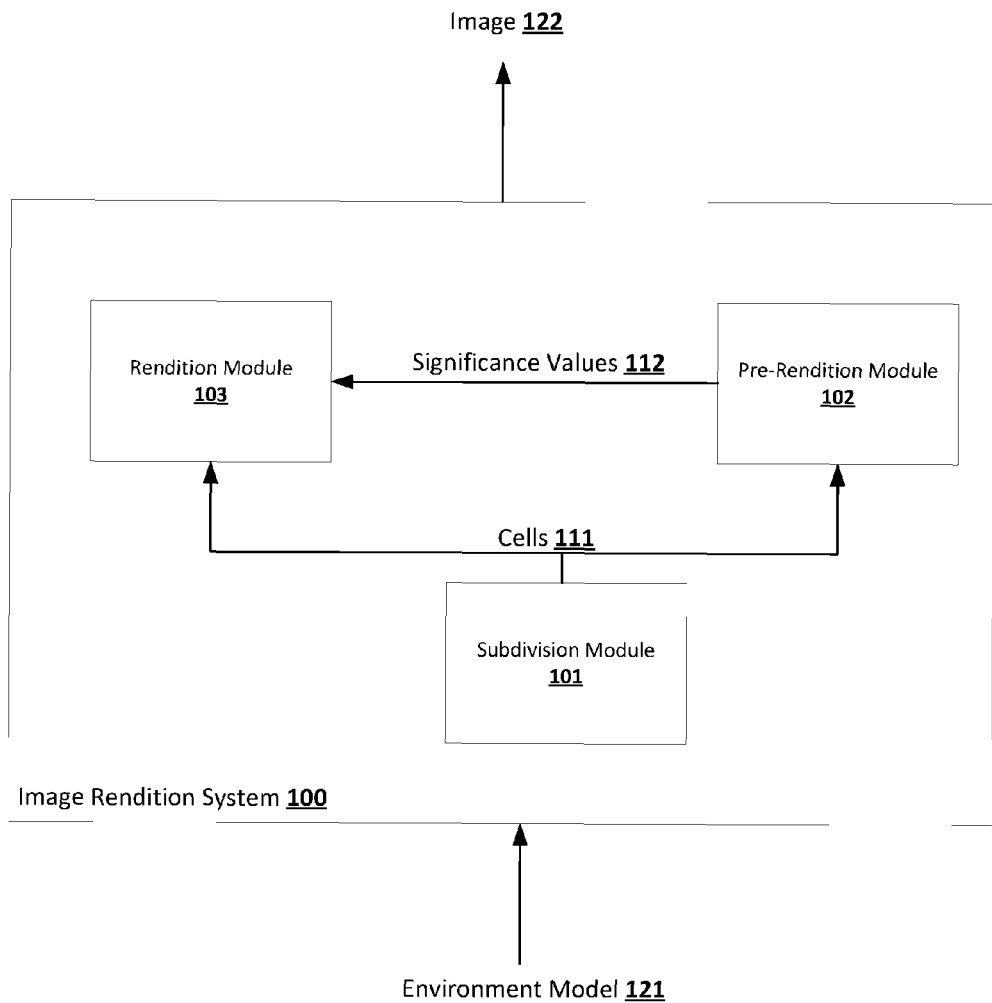
FIG. 1 is a block diagram of an example image rendering system.

FIG. 1 is a block diagram of an example image rendering system 100. The image rendering system 100 is an example system of one or more computers that is capable of rendering an image 122 of a scene, where the scene is a three-dimensional environment that includes multiple points and is affected by multiple light sources.

The image rendering system 100 obtains as input a model of the scene 121 and analyzes the model 121 to generate a rendered image 122 of the scene. The model 121 may include structured data that describes interactions between light sources affecting the scene and objects in the scene. For example, the model 121 may include one or more of a visual representation of the scene, information about the position and/or orientation of a camera recording an image of the scene, information about light sources affecting the scene such as properties of those light sources, and information about objects in the scene such as modeling transformations and surface properties of those objects.

The image rendering system 100 includes a subdivision module 101, a pre-rendering module 102, and a rendering module 103.

The rendering module 103 determines a color value for each pixel of the rendered image based on the interaction of points in the scene with the light sources affecting the scene. To do so, the rendering module 103 may employ an image rendering technique called ray tracing. The ray tracing technique involves, in part, casting rays from points in the scene to light sources affecting the scene. The ray tracing technique is described in greater detail below with reference to FIG. 2.

In one possible approach, a rendering module 103 employing a ray tracing technique can cast a ray from every point in the scene or from every group of points in the scene to every light source in the scene. However, this brute force approach can be computationally costly when the number of light sources is relatively high, e.g., tens or hundreds of light sources.

To avoid the computational costs associated with the brute force approach described above, the rendering module 103 samples rays to cast from points in the scene to the light sources affecting the scene. In other words, the rendering module 103 selects a particular group of point-light source pairings that do not include every possible pairing of the points in the scene and the light sources affecting the scene, and, for each selected pairing, casts a ray from the point in the pairing to the light source in the pairing.

To sample rays, the rendering nodule 103 employs a sampling method. The sampling method may depend on a variety factors, such as one or more of the sampling rate (the ratio of a count of the sampled rays to a total count of possible rays) and the desired resolution of the image 122 of the scene.

In general, however, the sampling method employed by the rendering module 103 depends at least in part on a measure of significance of each light source to rendering points in each "cell" 111 in the scene. A cell in a scene includes a group of points in the scene. This measure of significance of a light source to rendering points in a cell 111 is referred to as a "significance value" 112 of the light source and the cell 111. The sampling method employed by the rendering module 103 samples rays in a way that, for each cell 111 in the scene, more rays will be cast from the points in the cell 111 to the light sources having a higher significance value 112 with respect to the cell 111 relative to the light sources having a lower significance value 112 with respect to cell 111.

The image rendering system 100 generates significance values 112 for each light source and each cell 111. To do so, the image rendering system 100 uses the subdivision module 101 to divide the scene into cells 111 and the pre-rendering module 102 to generate significance values for each light source and each cell 111, i.e., each light source-cell pair.

The subdivision module 101 can divide the scene into cells 111 in any manner that associates each point in the scene to a respective one of the cells. The manner of subdividing the scene can use one or more of the following subdivision techniques: a sphere projection subdivision technique, a 3-dimensional grid subdivision technique, an image space subdivision technique, and an acceleration structure-based subdivision technique. The sphere projection subdivision technique, the 3-dimensional grid subdivision technique, and the image space subdivision technique are described below with reference to FIGS. 4A, 4B and 4C respectively.

An acceleration structure-based subdivision technique divides the scene into cells 111 that each correspond to a particular component of an acceleration structure, such as a bounding volume hierarchy acceleration structure, a k-dimensional tree acceleration structure, etc. For example, a particular acceleration structure-based subdivision technique can divide the scene into cells 111, where each of the cells 111 corresponds to an nth degree bounding volume in a bounding volume hierarchy acceleration structure corresponding to the scene. Example acceleration structures are described in Spjut, *Efficient Ray Tracing Architectures*, sec. 1.3.1, available at http://josefspjut.me/pubs/thesis.pdf and Ize, and *Efficient Acceleration Structures for Ray Tracing Static and Dynamic Scenes*, available at http://www.cs.utah.edu/~thiago/papers/thesis_ize.pdf.

In some implementations, the subdivision module 101 can divide different portions of the scene into cells 111 using different subdivision techniques. For example, the subdivision module 101 can divide a portion of the scene that falls into a field of view of an image capturing point capturing the image, e.g., a camera, using the image space subdivision technique and the rest of the scene using a sphere projection subdivision technique.

The pre-rendering module 102 obtains an identification of the cells 111 and generates a significance value 112 for each light source—cell pair. Generating significance values is described in greater detail below with reference to FIGS. 3 and 5-6.

The rendering module 103 of the image rendering system 100 uses the significance values 112 generated by the pre-rendering module 102 to render the image 122 of the scene. The rendering module 103 may, when performing image rendering using ray tracing, cast more rays from points in a cell to a light source that has a higher significance value with respect to the cell relative to a light source that has a lower significance value with respect to the cell.

Figure 2:
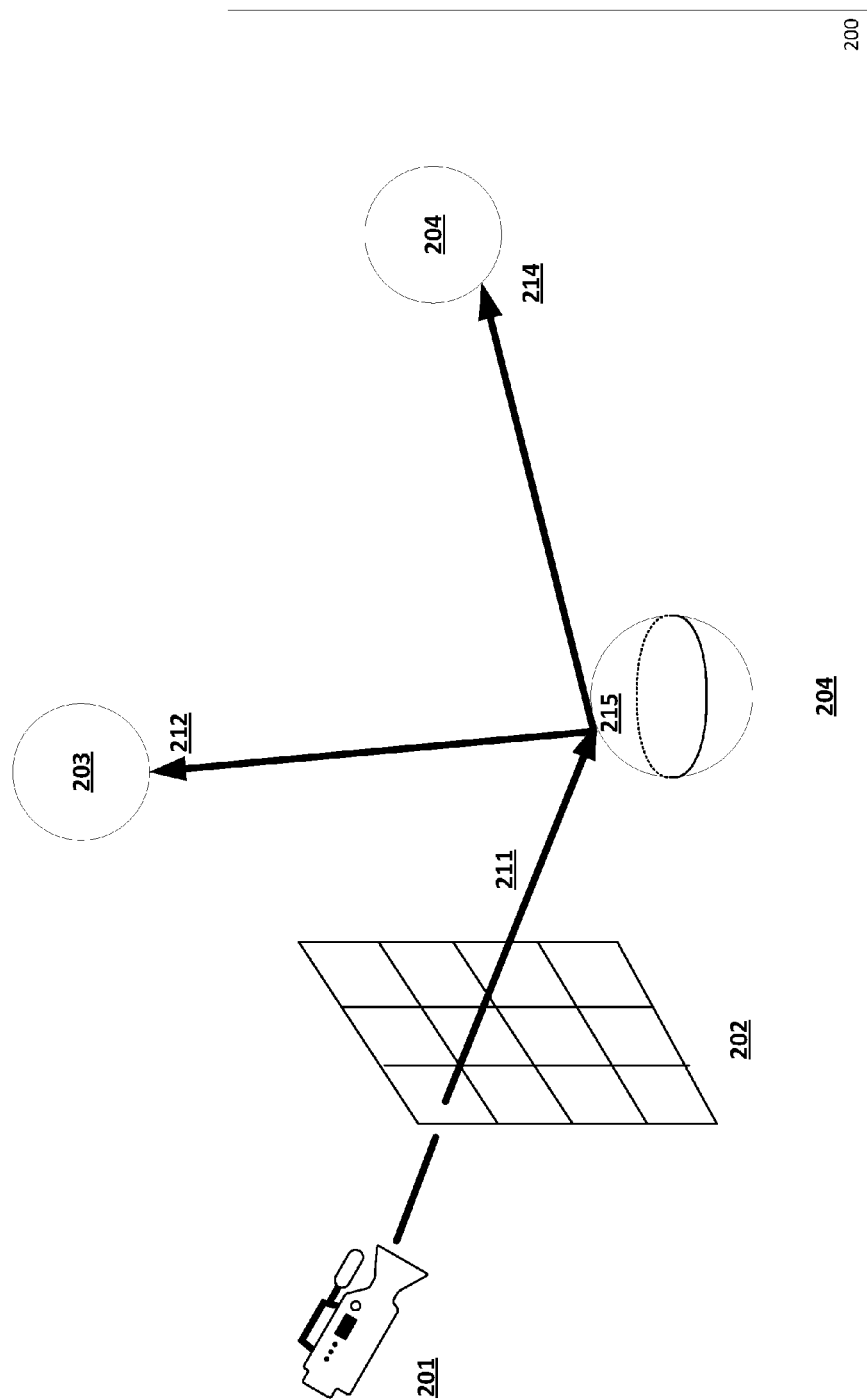
FIG. 2 illustrates an operational example of ray tracing.

FIG. 2 illustrates an operational example of ray tracing. An image rendering system, e.g., the image rendering system 100 of FIG. 1, uses ray tracing as illustrated to render an image 202 of the scene 200 captured from the image capturing point of a camera 201, where the scene is affected by multiple light sources, i.e., light source 204 that is situated inside the scene 200 and light source 203 that is situated outside the scene 200.

The image rendering system casts a ray 211 from the camera 201 through a pixel of the image 202. The ray 211 intersects with a particular point in the scene 200 at an intersection point 215. The image rendering system then casts rays from the intersection point 215 to one or more selected light sources of the light sources in the scene 200, i.e., ray 212 to light source 203 and ray 214 to light source 204. Determining which light sources to select for casting rays from the intersection point 115 to the light source can be performed based on the significance value of the light source to a cell of the scene 200 that includes the intersection point 215.

The image rendering system determines, for each selected light source and the intersection point 215, a contribution value that indicates a contribution of each selected light source to the color of intersection point 215 based on one or more factors such as whether the ray cast from the intersection point 215 to the light source intersects with another object on its way, the light reflection qualities of any intersecting objects, the distance between the selected light source and the intersection point 215, the intensity of the light emitted from the light source, etc. The image rendering system may determine contribution values based on one or more intersection testing techniques and/or one or more shading techniques. Example intersection testing techniques are described in Shirley et al., *Fundamentals of Computer Graphics*, ch. 10, available at https://www.cs.utah.edu/~shirley/books/fcg2/rt.pdf. Example shading techniques are described in Gouraud, *Continuous Shading of Curved Surfaces*, available at http://page.mifu-berlin.de/block/htw-lehre/wise2015_2016/bel_und_rend/skripte/gouraud1971.pdf and Phong, *Illumination for Computed Generated Pictures*, available at http://www.cs.northwestern.edu/~ago820/cs395/Papers/Phong 1975.pdf.

Figure 3:
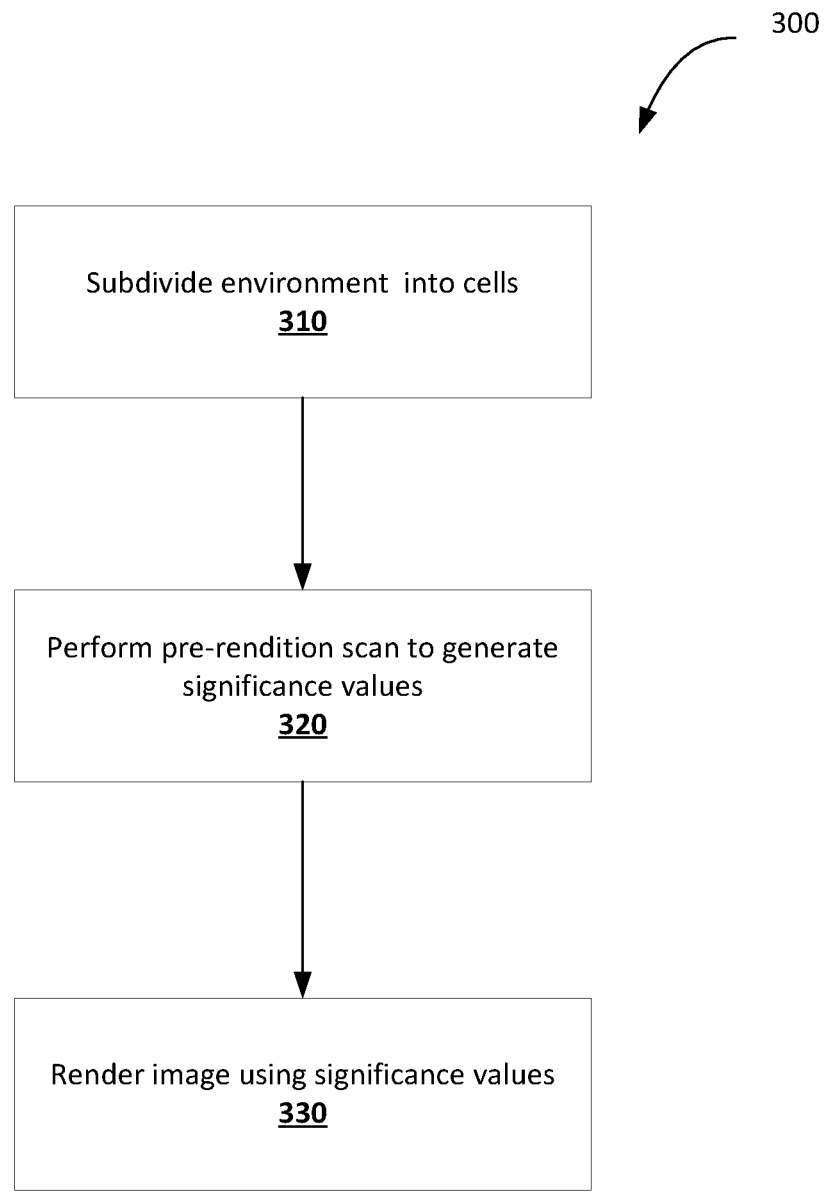
FIG. 3 is a flow chart of an example process for rendering an image of a scene.

FIG. 3 is a flow diagram of an example process 300 for rendering an image of a scene. The process 300 can be performed by a system of one or more computers, e.g., the image rendering system 100 of FIG. 1.

The system subdivides the scene into cells (310). Subdividing the scene into cells is described in greater detail below with reference to FIGS. 4A-4C.

The system performs a pre-rendering scan of the scene (320) to generate, for each light source and each cell, a significance value. A significance value for a light source-cell pair is a value that indicates a significance of the light source to rendering points in the cell. To generate significance values for a light source—cell pair, the system can use one or more values that indicate a measure of interaction between the light source and at least one point in the cell, i.e. one or more "interaction values" for the light source-cell pair.

To obtain interaction values, the system can cast rays from multiple points in the scene to light sources and analyze the results of the casted rays to determine interaction values for light source-cell pairs. To cast rays from points to light sources, the system can select light source-point pairs using a sampling method, e.g., a random sampling method.

For example, the system can determine a count of light source-point pairs to select based on at least one of user data and a desired efficiency of the rendering process. For example, the system can determine a lower count of pairs to generate a final image with a higher efficiency. The system can then select x light source-cell pairs, where x equals the determined count, based on a sampling method. The system can then cast a ray corresponding to each selected pair from the point in the selected pair to a light source in the selected pair. The system can then analyze, e.g., using a shading technique, an intersection testing technique, or both, the results of the rays casted from points in a cell to each light sources to determine interaction values for the light source-cell pair.

The interaction values for a light source-cell pair can include at least one of: (1) a maximum contribution value of the light source to the color of the points in the cell; and (2) an interaction ratio that is a ratio of a count of rays cast from the points in the cell to the light source that reached the light source to a count of total rays cast from the points in the cell to the light source. Some rays cast from points in a scene to a light source may not reach the light source, e.g., due to intersection with objects that lie between the points and the cell. When a ray corresponding to a light source-point pair fails to reach the light source, this can indicate that the light from the light source does not affect the point. Thus, the ratio of rays cast from points in a cell that reach the light source to the total number of rays cast from points in the cell to the light source can indicate a measure of interaction between the points in the cell and the light source.

In some implementations, the system uses the maximum contribution value of a light source to points in a cell or the interaction ratio of the rays cast from points in the cell to the light source as the significance value for the light source-cell pair. In some other implementations, the system can combine, e.g., add, the maximum contribution value and the interaction ratio to determine the significance value.

Generating a maximum contribution value for a light source-cell pair is described in greater detail below with reference to FIG. 5. Generating an interaction ratio for a light source—cell pair is described in greater detail below with reference to FIG. 6.

In some implementations, the system normalizes the significance values associated each cell, e.g., by dividing each significance value by a sum of all significance values associated with the cell. The system can use normalized significance values as probability values.

The system renders the image using significance values generated during the pre-rendering scan (330). The system can, during a rendering scan, cast more rays from the points in a cell to the light sources having a higher significance value with respect to the cell relative to the light sources having a lower significance value with respect to the cell, i.e., sample light sources having a higher significance values more often. By doing this, the system can sample light sources in a manner that takes into account the significance of a light source to rendering points in cells in a scene and thus avoid sampling particular light sources with respect to points in the scene that are not significantly affected by the particular light sources.

For example, the system can map each significance value associated with a light source to a corresponding domain in a particular range according to a probability distribution determined by normalizing the significance values. The system can then randomly sample values from the particular range and sample the light source for a particular cell if the randomly sampled value falls within a domain corresponding to the normalized significance value for the light source-cell pair. Because a domain associated with a higher significance value is larger than a domain associated with a lower significance value, the system will likely select the light source associated with the higher significance value more frequently than the light source associated with the lower significance value when the system randomly samples values in the particular range.

For example, if normalized significance values associated with a particular light source are 0.7, and 0.1 for cells A, B, and C, the system can map those normalized significance values to domains [0, 0.7), [0.7, 0.9), and [0.9, 1) in the range [0, 1) respectively. The system can then sample a value from the range [0, 1). If the value falls within the domain [0,0.7), the system can sample the particular light source for cell A. If the value falls within the domain [0.7,0.9), the system can sample the particular light source for cell B. If the value falls within the domain [0.9,1), the system can sample the particular light source for cell C.

While the system is described as performing a pre-rendering scan to generate the significance value, the data collection required to generate significance values can be performed at various times relative to the rendering process. For example, in some implementations, instead of performing the data collection during a pre-rendering scan, the data collection can be interleaved with the rendering, e.g., in a progressive rendering technique.

Figure 4A:
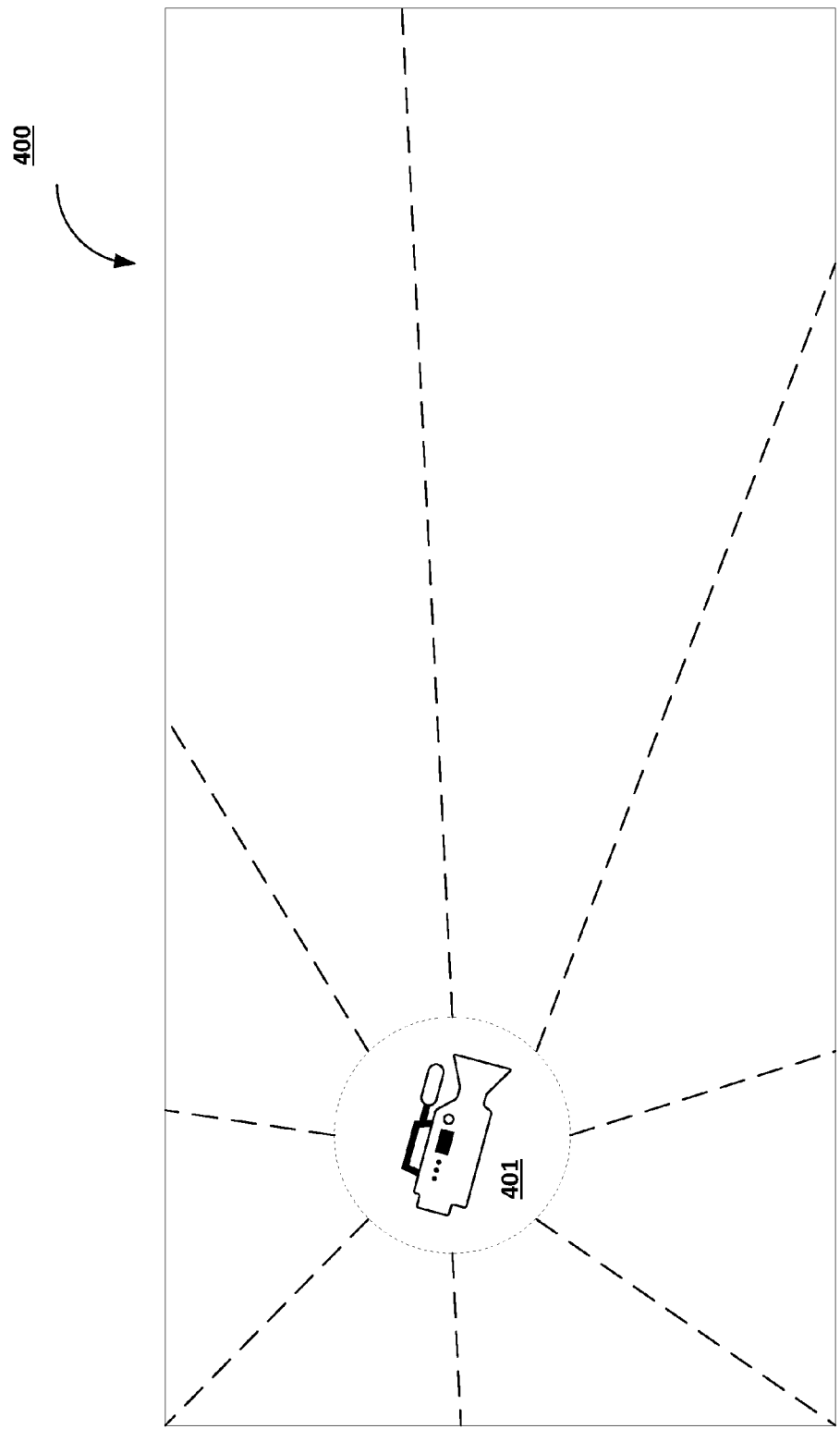
FIGS. 4A-4C illustrate example subdivisions of a scene into multiple cells.
Figure 4B:
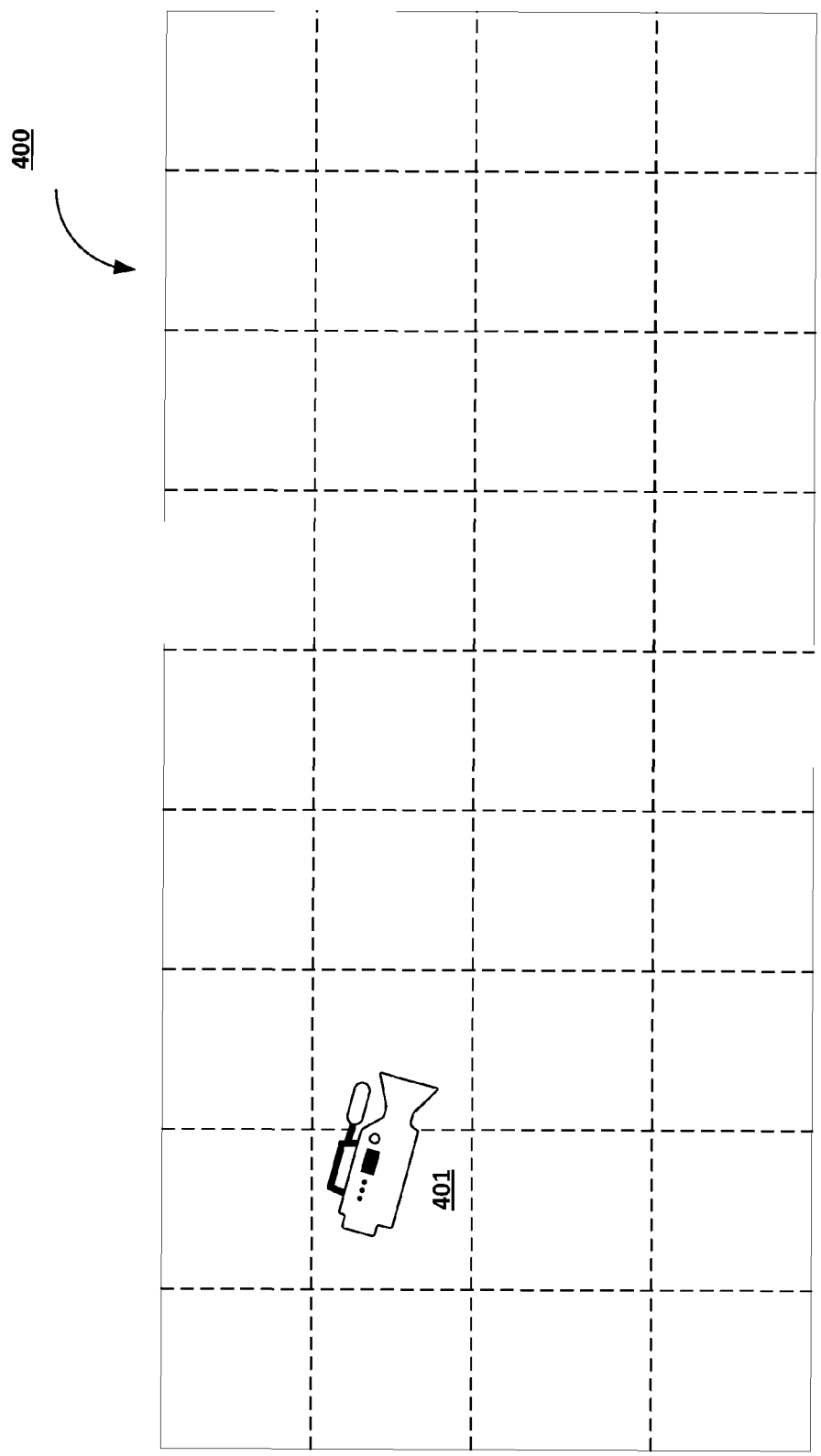
Figure 4C:
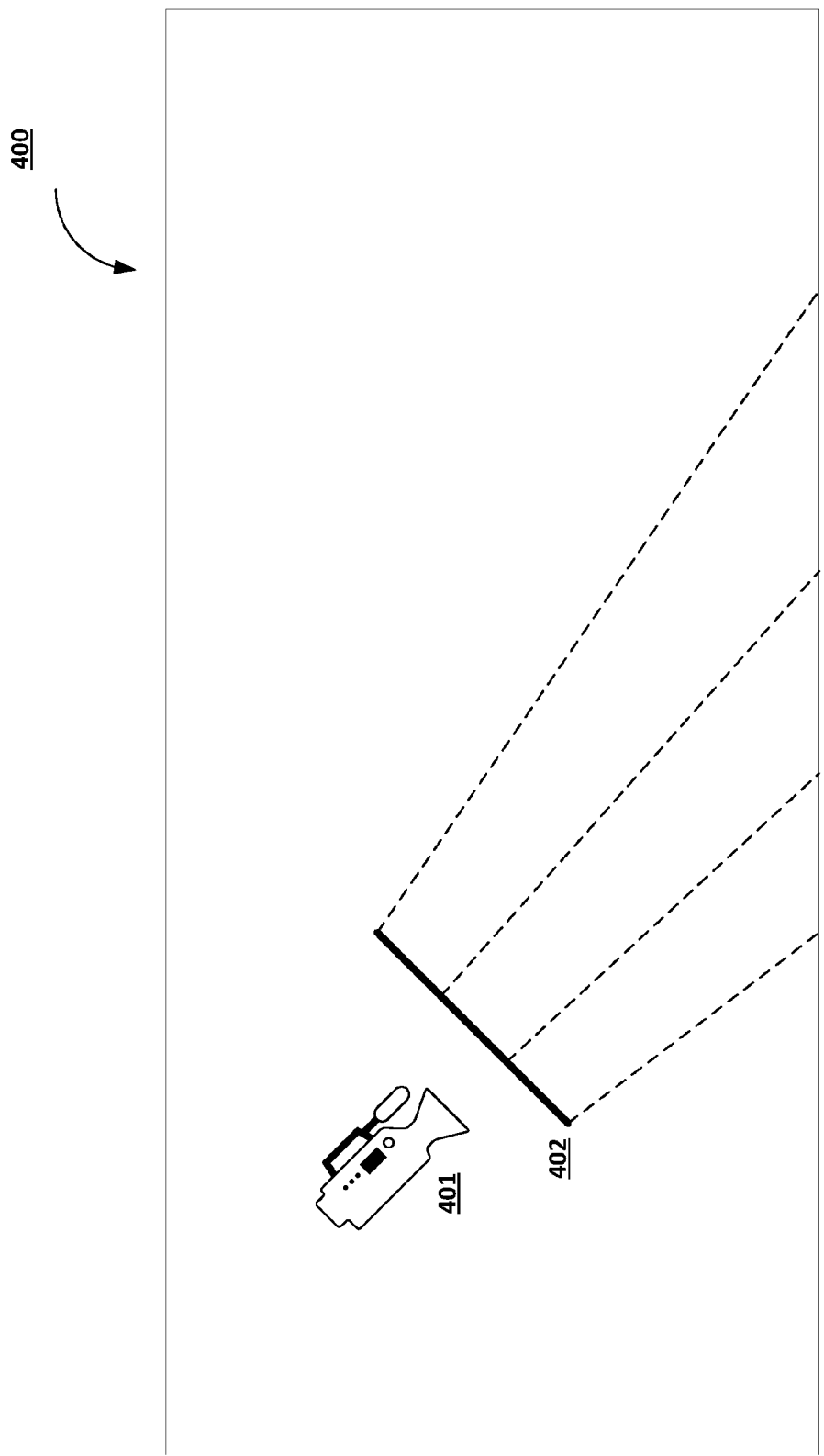

FIGS. 4A-4C illustrate example subdivisions of a scene 400 into multiple cells. The illustrated subdivision may be performed by a system of one or more computers, e.g., the image rendering system 100 of FIG. 1.

The system can divide the scene into cells in a uniform or non-uniform manner. When performing uniform subdivision, the system divides the scene into multiple cells of the same size. When performing non-uniform subdivision, the system divides the scene into multiple cells of variable sizes. The system can perform subdivision of a scene by dividing each dimension, i.e., axis, of the scene into multiple subdomains and defining a cell that includes the area in the scene corresponding to each subdomain. The system can perform subdivision by any technique that associates each point in the scene with a particular cell.

FIG. 4A illustrates subdividing the scene 400 into multiple cells using a sphere projection subdivision technique. To employ this technique, the system creates a virtual space 403 around an image capturing point from which an image of the scene is recorded, e.g., a camera 401, generates quadrilaterals that neighbor the virtual space, and assigns the points covered by each quadrilateral to a cell.

FIG. 4B illustrates subdividing the scene 400 into multiple cells using a 3-dimensional grid subdivision technique. To employ this technique, the system divides the scene into 3-dimensional voxels and assigns the points covered by each voxel to a cell. In FIG. 4, each voxel is represented by a square, such as square 404.

FIG. 4C illustrates subdividing the scene 400 into multiple cells using an image space subdivision technique. To employ this technique, the system divides the image 402 of the camera 401 into regions, e.g., pixels, and assigns the area of the scene 400 corresponding to each region to a cell, e.g., by casting a ray through each region and determining what areas of the scene are covered by each region. This subdivision technique may subdivide only a portion of the scene 400 that is captured by the camera 401 given its field of view. Thus, the system may use this subdivision technique for portions of the scene 400 and use other subdivision techniques for other portions of the scene that the system has not subdivided using the image space subdivision technique.

Figure 5:
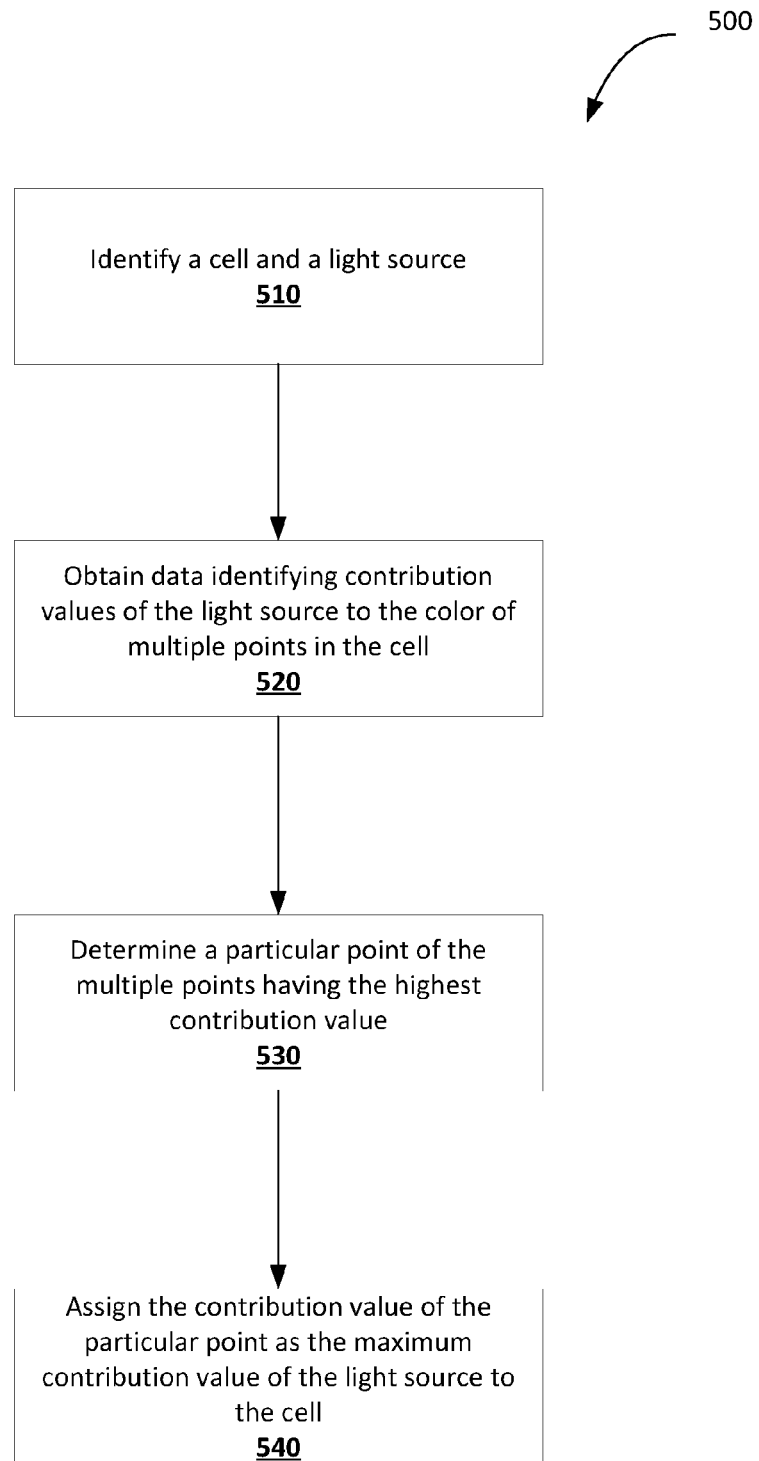
FIG. 5 is a flow chart of an example process for determining a maximum contribution value for a light source and a cell in a scene.

FIG. 5 is a flow diagram of an example process 500 for determining a maximum contribution value for a light source and a cell in a scene. The process 500 can be performed by a system of one or more computers, e.g., the image rendering system 100 of FIG. 1.

The system identifies a cell and a light source (510) and obtains data identifying contribution values of the light source to the color of multiple points in the cell (520). The system may generate the data identifying the contribution values by using at least one shading technique and/or at least one intersection testing technique, such as a technique that uses ray tracing, as described above with reference to FIG. 2.

The system determines a particular point of the multiple points having a highest contribution value from the light source (530).

The system assigns the contribution value of the particular point as the maximum contribution value of the light source to the cell (540).

Figure 6:
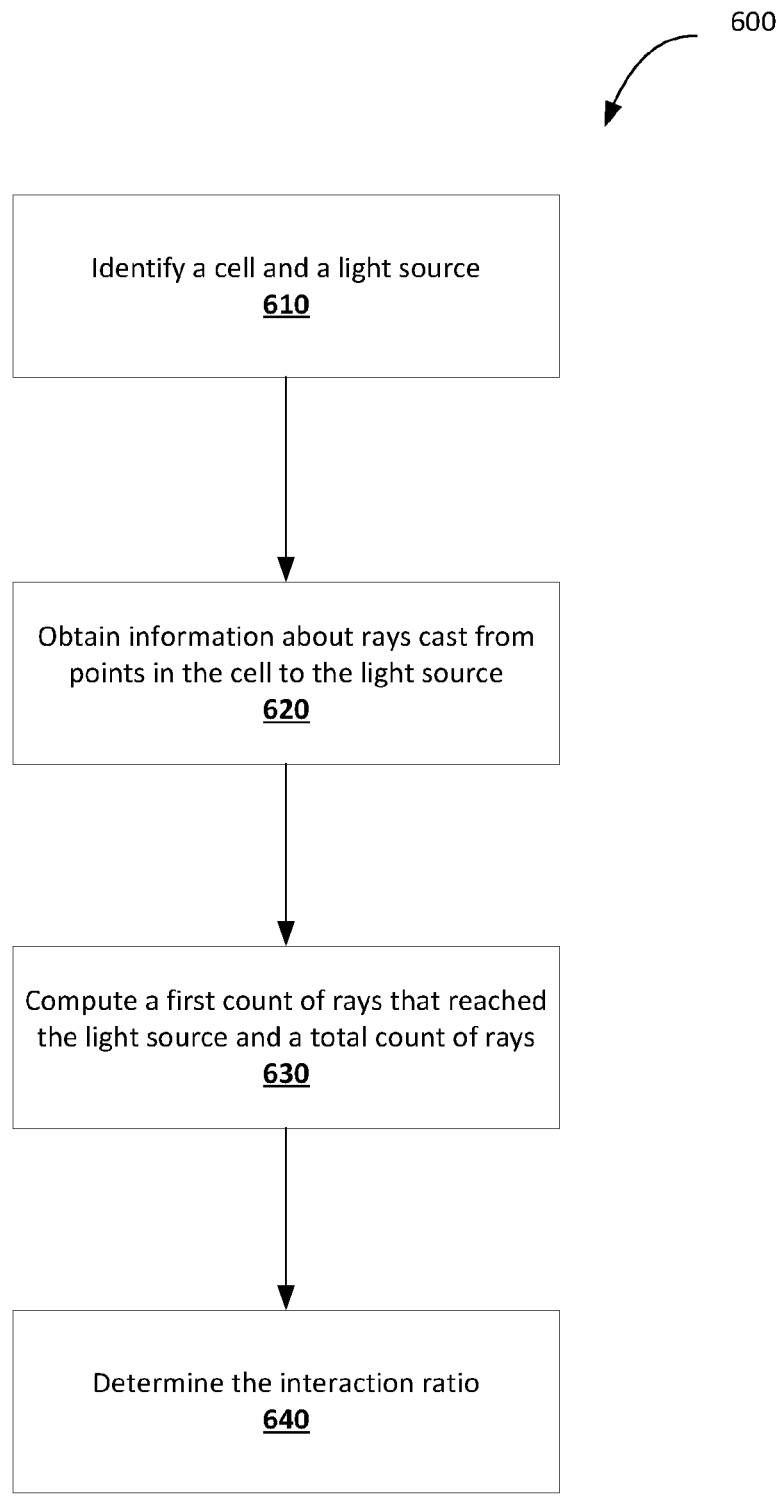
FIG. 6 is a flow chart of an example process for determining an interaction ratio for a light source and a cell in a scene.

FIG. 6 is a flow diagram of an example process 600 for determining an interaction ratio for a light source and a cell in a scene. The process 600 can be performed by a system of one or more computers, e.g., the image rendering system 100 of FIG. 1.

The system identifies a cell and a light source (610) and obtains information about rays cast from points in the cell to the light source (620). The information includes a final destination of each ray. The system may generate such final destination information by using at least one shading technique and/or at least one intersection testing technique, such as a technique that use ray tracing, as described above with reference to FIG. 2.

The system computes a first count of rays cast from points in the cell that reached the light source and a total count of rays cast from points in the cell (630). The system determines the interaction ratio (640) by computing a ratio of the first count and the total count.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:
1. A method for rendering an image of a scene, wherein the scene is affected by a plurality of light sources, the method comprising:
   subdividing the scene into a plurality of cells;
   performing data collection to generate significance values, including:
      sampling a plurality of light source—point pairs, each pair including a respective light source of the plurality of light sources and a point in the scene;

for each pair, determining a contribution value of the light source in the pair to a color of the point in the pair;

for each cell and for each light source:
   determining a maximum contribution value of the contribution values for the light source to the color of the points that are in the cell, and
   determining, based on the maximum contribution value, a significance value that is a measure of an estimated importance of the light source in rendering a portion of the image corresponding to the cell; and rendering the image of the scene by sampling light sources having a higher significance value more often than light sources having a lower significance value.

2. The method of claim 1, wherein determining a contribution value of the light source in a pair to a color of the point in the pair comprises: casting a ray from the point to the light source; and performing an analysis of the ray to determine the contribution value.

3. The method of claim 2, further comprising:
determining, for each cell and for each light source, a ratio of a count of rays cast to the light source from the points in the cell that reached the light source and a total count of rays cast to the light source from the points in the cell; and
updating each significance value for each cell and each light source based on the ratio associated with the corresponding cell and light source.

4. The method of claim 1, further comprising:
for each cell, normalizing each significance value associated with the cell based on a sum of all significance values associated with the cell.

5. The method of claim 1, wherein:
the image is captured from an image capturing point; and
subdividing the scene into the plurality of cells comprises:
   creating a virtual space around the image capturing point,
   generating a plurality of quadrilaterals that neighbor the virtual space, and
   assigning points covered by each quadrilateral to a cell of the plurality of cells.

6. The method of claim 1, wherein subdividing the scene into the plurality of cells comprises dividing the scene into a plurality of 3-dimensional voxels and assigning points in an area covered by each 3-dimensional voxel to a cell of the plurality of cells.

7. The method of claim 1, wherein subdividing the scene into the plurality of cells comprises:
dividing the image into a plurality of portions;
determining an area in the scene covered by each portion of the plurality of portions; and
assigning points in each area in the scene covered by each portion of the plurality of portions to a cell of the plurality of cells.

8. A system for rendering an image of a scene, wherein the scene is affected by a plurality of light sources, comprising one or more computers and one or more storage devices storing instructions that when executed by the one or more computers cause the one or more computers to perform operations for rendering an image, the operations comprising:
subdividing the scene into a plurality of cells;
performing data collection to generate significance values, including:
   sampling a plurality of light source—point pairs, each pair including a respective light source of the plurality of light sources and a point in the scene;
   for each pair, determining a contribution value of the light source in the pair to a color of the point in the pair;
   for each cell and for each light source:
      determining a maximum contribution value of the contribution values for the light source to the color of the points that are in the cell, and
      determining, based on the maximum contribution value, a significance value that is a measure of an estimated importance of the light source in rendering a portion of the image corresponding to the cell; and
rendering the image of the scene by sampling light sources having a higher significance value more often than light sources having a lower significance value.

9. The system of claim 8, wherein determining a contribution value of the light source in a pair to a color of the point in the pair comprises: casting a ray from the point to the light source; and performing an analysis of the ray to determine the contribution value.

10. The system of claim 9, the operations further comprising:
determining, for each cell and for each light source, a ratio of a count of rays cast to the light source from the points in the cell that reached the light source and a total count of rays cast to the light source from the points in the cell; and
updating each significance value for each cell and each light source based on the ratio associated with the corresponding cell and light source.

11. The system of claim 8, the operations further comprising:
for each cell, normalizing each significance value associated with the cell based on a sum of all significance values associated with the cell.

12. The system of claim 8, wherein:
the image is captured from an image capturing point; and
subdividing the scene into the plurality of cells comprises:
   creating a virtual space around the image capturing point,
   generating a plurality of quadrilaterals that neighbor the virtual space, and
   assigning points covered by each quadrilateral to a cell of the plurality of cells.

13. The system of claim 8, wherein subdividing the scene into the plurality of cells comprises dividing the scene into a plurality of 3-dimensional voxels and assigning points in an area covered by each 3-dimensional voxel to a cell of the plurality of cells.

14. The system of claim 8, wherein subdividing the scene into the plurality of cells comprises:
dividing the image into a plurality of portions;
determining an area in the scene covered by each portion of the plurality of portions; and
assigning points in each area in the scene covered by each portion of the plurality of portions to a cell of the plurality of cells.

15. A computer program product encoded on one or more non-transitory computer storage media, the computer program product comprising instructions that when executed by one or more computers cause the one or more computers to perform operations for rendering an image of a scene, wherein the scene is affected by a plurality of light sources, the operations comprising: subdividing the scene into a plurality of cells; performing data collection to generate significance values, including: sampling a plurality of light source—point pairs, each pair including a respective light source of the plurality of light sources and a point in the scene; for each pair, determining a contribution value of the light source in the pair to a color of the point in the pair; for each cell and for each light source: determining a maximum contribution value of the contribution values for the light source to the color of the points that are in the cell, and determining, based on the maximum contribution value, a significance value that is a measure of an estimated importance of the light source in rendering a portion of the image corresponding to the cell; and rendering the image of the scene by sampling light sources having a higher significance value more often than light sources having a lower significance value.

16. The computer program product of claim 15, wherein determining a contribution value of the light source in a pair to a color of the point in the pair comprises: casting a ray from the point to the light source; and performing an analysis of the ray to determine the contribution value.

17. The computer program product of claim 15, further comprising:

for each cell, normalizing each significance value associated with the cell based on a sum of all significance values associated with the cell.

18. The computer program product of claim 15, wherein:

the image is captured from an image capturing point; and subdividing the scene into the plurality of cells comprises:

creating a virtual space around the image capturing point, generating a plurality of quadrilaterals that neighbor the virtual space, and assigning points covered by each quadrilateral to a cell of the plurality of cells.

19. The computer program product of claim 15, wherein subdividing the scene into the plurality of cells comprises dividing the scene into a plurality of 3-dimensional voxels and assigning points in an area covered by each 3-dimensional voxel to a cell of the plurality of cells.

20. The computer program product of claim 15, wherein subdividing the scene into the plurality of cells comprises:

dividing the image into a plurality of portions;

determining an area in the scene covered by each portion of the plurality of portions; and assigning points in each area in the scene covered by each portion of the plurality of portions to a cell of the plurality of cells.

\* \* \* \* \*